(12) United States Patent
Koechner et al.

(10) Patent No.: US 8,152,605 B1
(45) Date of Patent: Apr. 10, 2012

(54) HANDHELD CERVICAL DISLOCATOR

(76) Inventors: Mark Koechner, Tipton, MO (US);
Jeffrey Carl May, Lee's Summit, MO (US)

( * ) Notice: Subject to any disclaimer, the term of this patent is extended or adjusted under 35 U.S.C. 154(b) by 0 days.

(21) Appl. No.: 13/163,849

(22) Filed: Jun. 20, 2011

(51) Int. Cl.
*A22B 3/00* (2006.01)
(52) U.S. Cl. .......................................... 452/52
(58) Field of Classification Search ............. 452/6–9, 452/11, 17, 102, 103, 137, 198
See application file for complete search history.

(56) References Cited

U.S. PATENT DOCUMENTS

| 2,753,905 | A | * | 7/1956 | Anderson | 30/120.3 |
| 4,905,350 | A | * | 3/1990 | Gardner | 452/16 |
| 5,626,513 | A | * | 5/1997 | Curtis | 452/125 |
| 7,169,033 | B1 | * | 1/2007 | Colbert | 452/103 |
| 7,198,562 | B2 | * | 4/2007 | Whetstone et al. | 452/6 |
| 7,481,700 | B1 | * | 1/2009 | Leboeuf, Jr. | 452/6 |
| 2010/0105305 | A1 | | 4/2010 | Pizzurro | |

* cited by examiner

*Primary Examiner* — Richard Price, Jr.
(74) *Attorney, Agent, or Firm* — McKee, Voorhees & Sease, P.L.C.

(57) ABSTRACT

A handheld cervical dislocator that will encircle the neck of poultry of most any size and dislocate the neck vertebrae from the skull immediately to terminate the life of culled poultry with minimum discomfort.

6 Claims, 4 Drawing Sheets

HANDHELD CERVICAL DISLOCATOR

FIELD OF THE INVENTION

The present invention relates to cervical vertebrae dislocator for culled poultry and other small animals.

BACKGROUND OF THE INVENTION

Some poultry such as turkey and chickens are often raised under restricted or confined conditions on turkey farms and the like. These turkeys are transported as poults from a hatchery to a turkey farm early in life. They are fed and monitored with a high degree of regularity and eventually transfer from survival curve to a rapid growth curve corresponding the time of meat production. However, a predictable but small percentage of the poults unsuccessfully makes the switch to the growth curve and are either slow growing due to defective genetics or due to external environmental circumstances. These animals must be quickly identified and exsanguinated as soon as they are recognized as not capable of becoming meat producers. Anything less would mean increased feed costs and higher poultry meat prices. Accordingly, there is a real need for improved methods of euthanasia of poultry and other small animals that are being culled at a production facility. Typically, the current most common way is blunt trauma with a bat-like device. This not only causes the poultry trauma, but can actually have a psychological impact upon the processor that regularly needs to engage in this exercise.

This invention has as its primary objective the presentation of an improved exsanguinating or euthanasia device that can conveniently be employed on turkey farms or the like to immediately terminate the life of culled poultry and/or other small animals, all with minimized discomfort and minimum psychological trauma to the processer.

Another objective is to provide a device which is inexpensive, can be economically manufactured, and which has minimal parts to decrease the possibility of dysfunctional operation.

The method and means of accomplishing each of the above objectives will become apparent from the detailed description of the invention which follows.

BRIEF DESCRIPTION OF THE INVENTION

A handheld cervical dislocator that will circle the neck of poultry of most any size and dislocate the neck vertebrae from the skull immediately using a shearing/twisting action, to terminate the life of culled poultry, with minimum discomfort. The device comprises a pair of long arm levers pivotally connected with a shear plate and a pair of grippers, operated by swinging open and closed of a pair of handles to operate grippers and the shear plate, which upon closing creates gripping, shearing and twisting action, all simultaneously.

DETAILED DESCRIPTION OF THE PREFERRED EMBODIMENT

Figure 1:
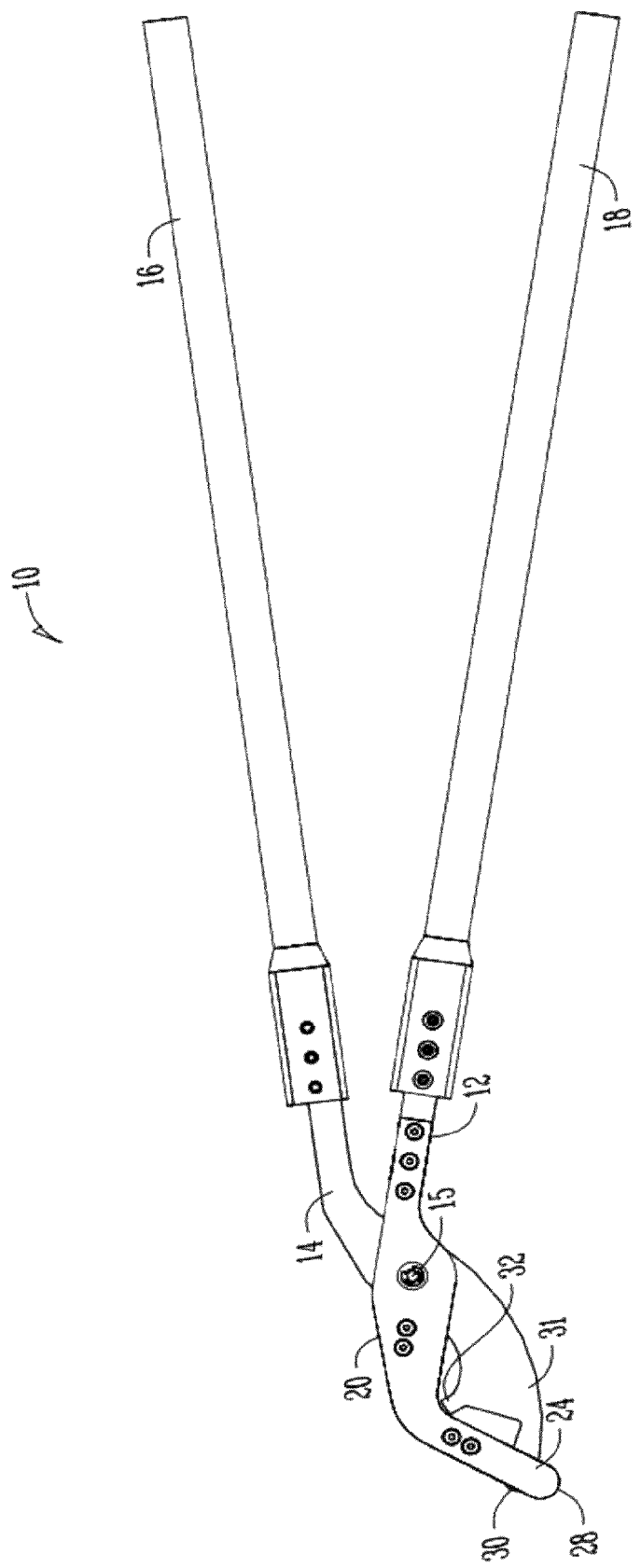
FIG. 1 is a side view of the cervical dislocator of the present invention, with the grips closed.
Figure 2:
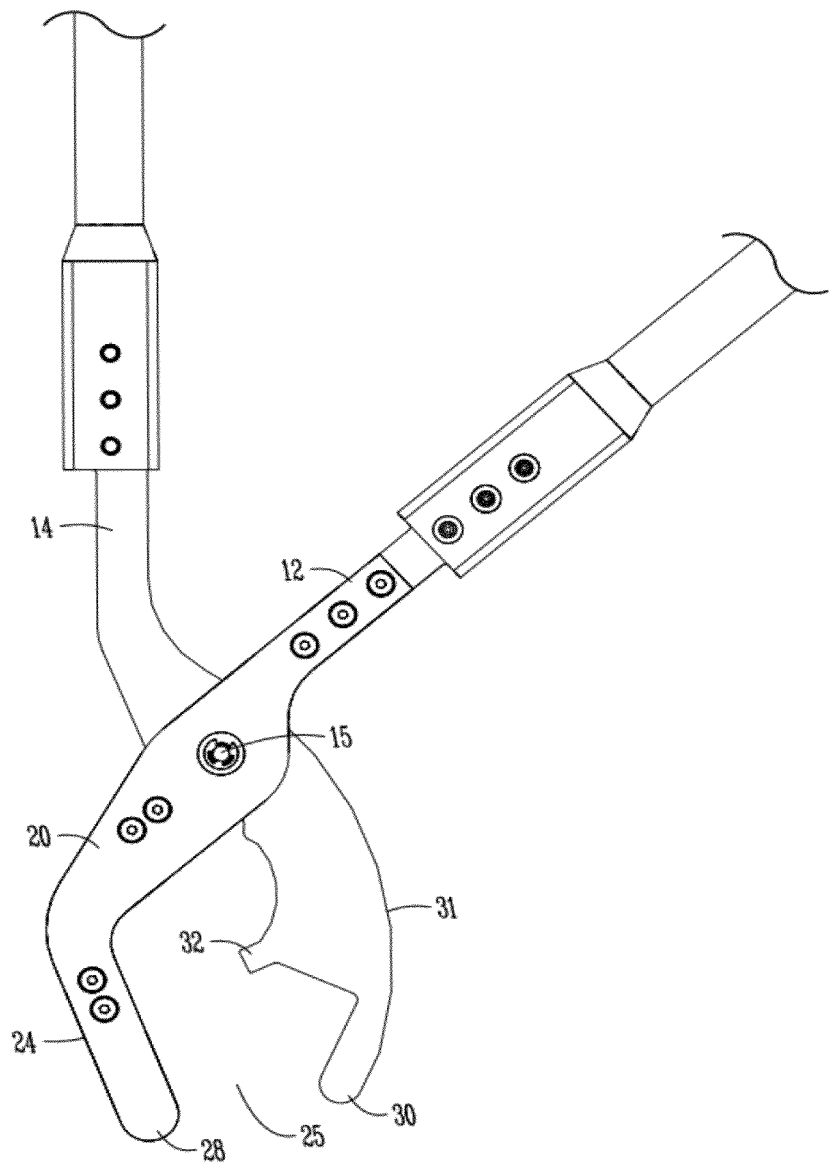
FIG. 2 is a partial side view of the device of the present invention, with the grips open.
Figure 3:
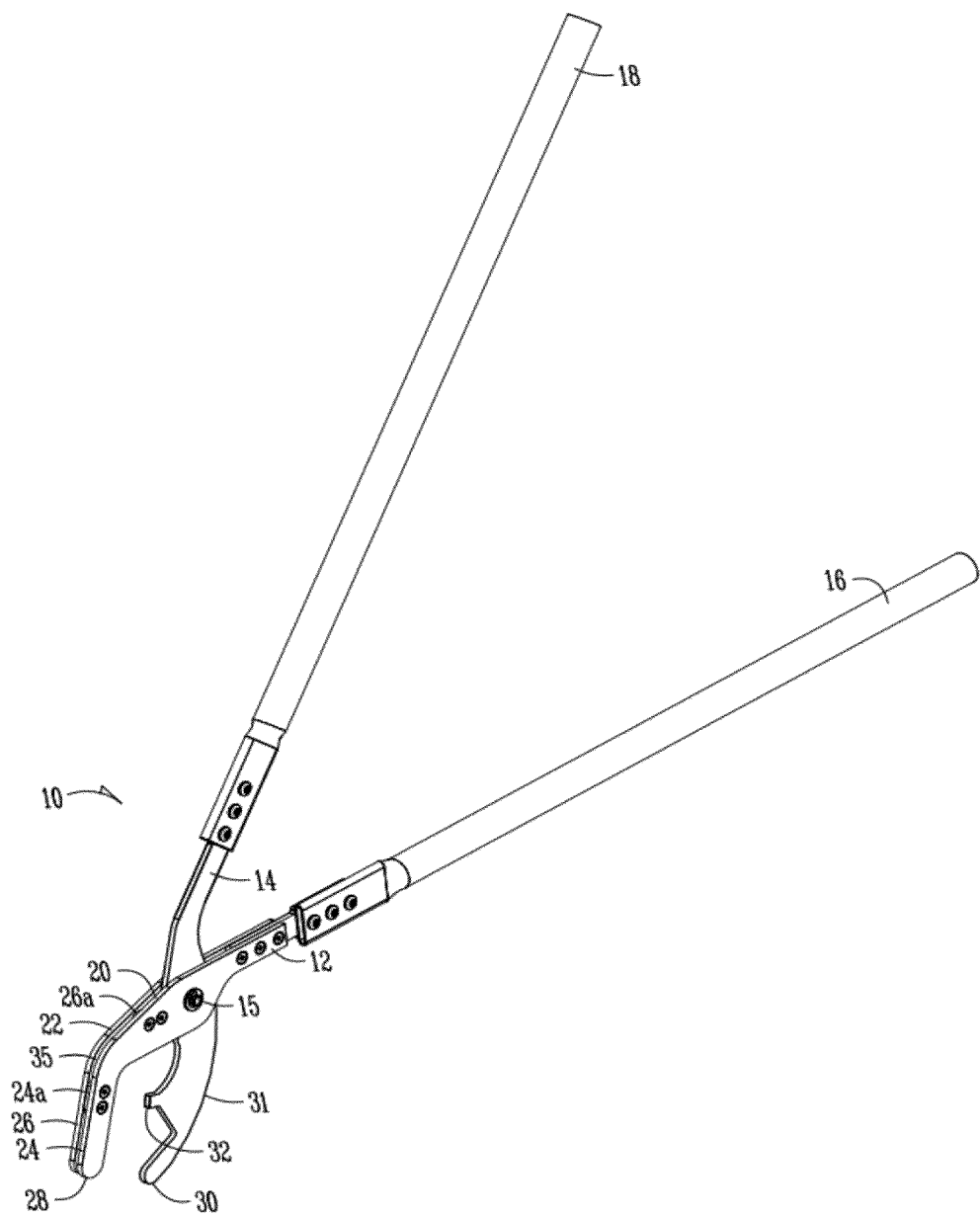
FIG. 3 is a perspective view of the device of the invention, with the grips open.
Figure 4:
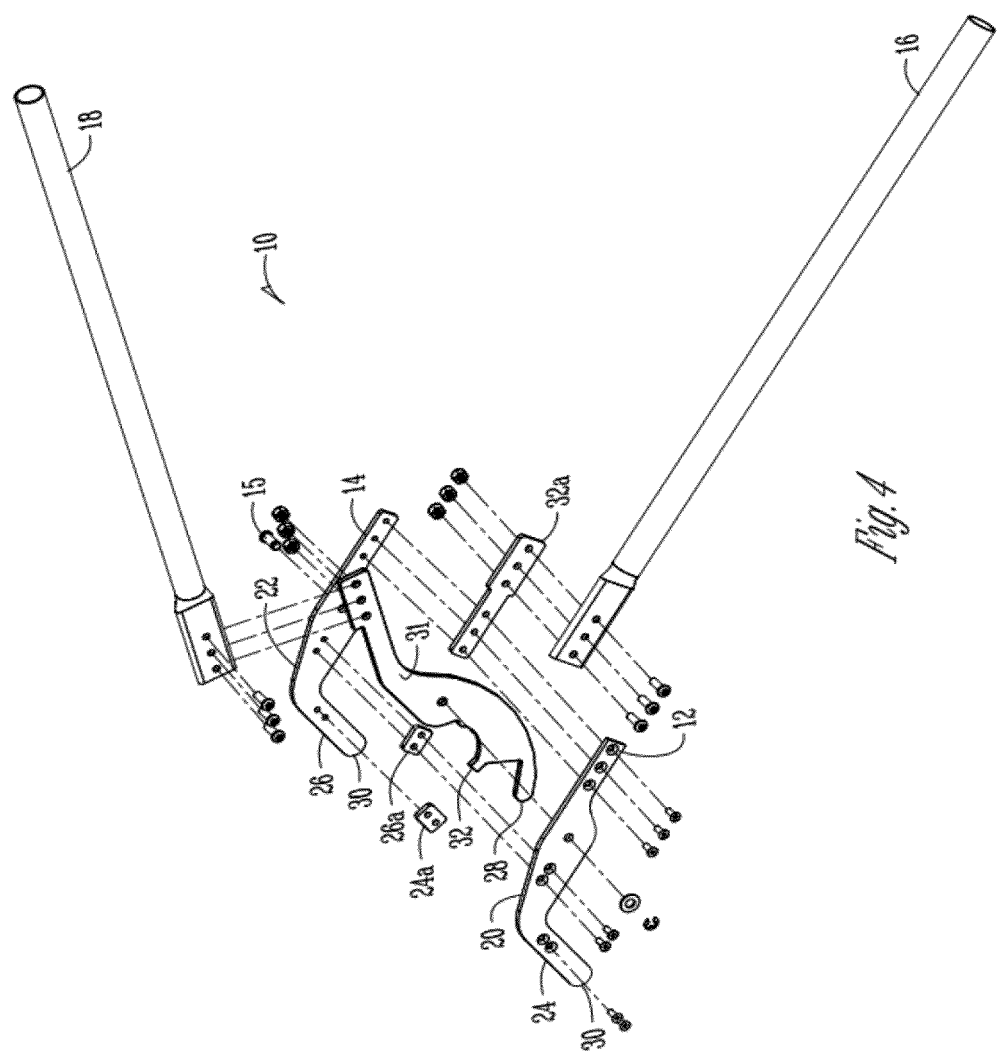
FIG. 4 is an exploded view of the device of the present invention.

As best seen in FIGS. 3 and 4, the cervical dislocator 10 is comprised of a pair of long armed levers 12, 14 pivotally connected by pivot pin 15. Levers 12 and 14 have handle ends 16, 18, respectively, and a gripper ends 20, 22. Gripper ends 20, 22 terminate with jaw blades 24, 26. Jaw blades 24, 26 are the same configuration, and held apart by spacers 24a and 26a, and terminate in blade ends 28 and 30. Grippers 20 and 22 pivot together at pin 15 when handles 16 and 18 are opened, to define the interior space 25 configuration shown best in FIG. 2. As best illustrated in the view of FIGS. 3 and 4 positioned between grippers 20, 22 is shear plate 31, also pivoting at pin 15. Shear plate 31 is attached via connector strap 32a to lever arm 16 and riveted to one end of handle 18 so that grippers 20 and 22 are attached to lever arms 16 and 18. Closing lever arms 16 and 18 apply a closing a twisting action with jaws 24 and 26 and shear plate 31. Shear plate 31 has an associated pressure punch post attached to it, shown at 32, which on closing rests in a space 35 defined between the grippers, 22 and 24.

In actual operation, the device works in the following manner. Lever arms 16, 18 are opened as illustrated in FIG. 2. When a turkey farm processor notices an animal to be culled, he or she inserts its neck into the opening between the gripper jaws shown in FIG. 2, and the jaws and shear plate 31 are closed as shown in FIG. 3 to provide a closing gripping and twisting action, all simultaneously, which results in dislocation of the neck followed by immediate death. The action is one of shearing the neck bone. One way of describing it is like putting a pencil on one's three fingers, middle finger under and ring and index finger over and applying pressure until the pencil snaps. Here the shear plate 31 passing between the two grippers creates the shear. This allows turkeys to be culled, the spread of disease controlled and the exsanguination of turkeys that are simply not progressing properly on the growth curve to justify continued feed costs. The device is easy to operate, can be operated with minimal psychological trauma by the operator, and can be operated without exhaustion to the operator since it ensures that each bird is properly terminated with minimum physical effort.

While the description here given has been primarily with respect to turkeys, other small animals such as chicken, rabbits, and the like may also be terminated as herein described.

What is claimed is:

1. A handheld cervical dislocator, comprising:
a pair of long arm levers pivotally connected intermediate the length of the levers, to a pair of grippers, and to a shear plate to form a pair of jaws operable toward and away from each other, said shear plate upon closing of said long arm levers, at least partially fitting between the pair of grippers which rotate at least partially past the shear plate to create a closing, grasping and twisting action.

2. The dislocator of claim 1 wherein said shear plate has a shear post to further enhance the twisting action when the jaws close.

3. The dislocator of claim 2 wherein each of said grippers are of identical configuration.

4. The dislocator of claim 3 wherein said grippers are arcuately curved with a blade end pointing generally toward said shear plate.

5. The dislocator of claim 2 wherein the said grippers are spaced apart and the shear posts fit within the defined space between the grippers upon closing.

6. The dislocator of claim 1 wherein each lever arm and its associated grippers are a single piece of forged steel.

* * * * *